US012619375B2

(12) United States Patent　　　　　(10) Patent No.:　　US 12,619,375 B2
Muthiah　　　　　　　　　　　　　　(45) Date of Patent:　　　　May 5, 2026

(54) DATA STORAGE DEVICE AND METHOD FOR ACCOMMODATING DATA OF A THIRD-PARTY SYSTEM

(71) Applicant: Sandisk Technologies, Inc., Milpitas, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/760,436

(22) Filed: Jul. 1, 2024

(65) Prior Publication Data

US 2026/0003538 A1　　　Jan. 1, 2026

(51) Int. Cl.
G06F 3/06　　　　　(2006.01)

(52) U.S. Cl.
CPC .......... G06F 3/0655 (2013.01); G06F 3/0604 (2013.01); G06F 3/0673 (2013.01)

(58) Field of Classification Search
CPC .... G06F 3/0655; G06F 3/0604; G06F 3/0673; G06F 12/02; G06F 12/0223; G06F 12/023; G06F 12/0238; G06F 12/0246; G06F 12/053; G06F 12/0284; G06F 12/0292; G06F 2212/70; G06F 2212/72; G06F 2212/7204; G06F 2212/7205; G06F 2212/7211
See application file for complete search history.

(56) References Cited

U.S. PATENT DOCUMENTS

| | | | |
|---|---|---|---|
| 8,648,867 B2 | 2/2014 | Gorchetchnikov et al. | |
| 10,216,419 B2 | 2/2019 | De | |
| 11,941,295 B2 | 3/2024 | Benisty et al. | |
| 2008/0055322 A1 | 3/2008 | Ryan et al. | |
| 2011/0292058 A1 | 12/2011 | Herr et al. | |
| 2017/0147516 A1* | 5/2017 | De | G06F 3/0685 |
| 2019/0005606 A1* | 1/2019 | Yang | G06T 1/60 |
| 2020/0356490 A1 | 11/2020 | Panesar et al. | |
| 2021/0117333 A1* | 4/2021 | Qureshi | G06F 3/0658 |
| 2021/0223991 A1* | 7/2021 | Lee | G06F 3/0659 |
| 2023/0032278 A1* | 2/2023 | Zhu | G06F 12/109 |
| 2023/0409217 A1* | 12/2023 | Ghaly | G06F 3/0679 |

(Continued)

OTHER PUBLICATIONS

Thompson, A. et al.; "GPUDirect Storage: A Direct Path Between Storage and GPU Memory"; Data Science Technical Blog entry; downloaded from the Internet on Jun. 30, 2024 at *GPUDirect Storage: A Direct Path Between Storage and GPU Memory | NVIDIA Technical Blog*; NVDIA®Developer; Aug. 6, 2019; 10 pages.

*Primary Examiner* — Tracy A Warren

(74) *Attorney, Agent, or Firm* — Crowell & Moring LLP

(57) ABSTRACT

A data storage device and method are provided for accommodating data of a third-party system. In one embodiment, a data storage device is provided comprising a memory and one or more processors. The one or more processors, individually or in combination, are configured to: receive data from a graphics processing unit (GPU) of a host; segregate the data; determine whether the host is pre-approved for a capacity condition; and in response to determining that the host is pre-approved for the capacity condition: associate the segregated data per a pre-approved destination; and consolidate logical-to-physical address entry updates into a logical-to-physical address data structure. Other embodiments are provided.

16 Claims, 12 Drawing Sheets

(56) References Cited

U.S. PATENT DOCUMENTS

| | | | |
|---|---|---|---|
| 2023/0409426 A1* | 12/2023 | Gurumurthi | G06F 11/1004 |
| 2024/0160376 A1* | 5/2024 | Ghaly | G06F 3/0604 |
| 2025/0007918 A1* | 1/2025 | Helmick | H04L 63/105 |
| 2025/0156314 A1* | 5/2025 | Langer | G06F 12/0246 |
| 2025/0165182 A1* | 5/2025 | Subbarao | G06F 3/0673 |

* cited by examiner

600

CPU

Instructions
1, 2 and 3

FW modules
for execution
of 1, 2 and 3

GPU

With GPUDirect Storage

DATA STORAGE DEVICE AND METHOD FOR ACCOMMODATING DATA OF A THIRD-PARTY SYSTEM

BACKGROUND

A host can write data to and read data from a data storage device. Some hosts have one or more graphics processing units (GPUs) in addition to a central processing unit (CPU). GPUs can be useful when the host runs applications related to artificial intelligence (AI) or high-performance computing (HPC), for example.

DETAILED DESCRIPTION

Figures 1A, 1B, 1C:
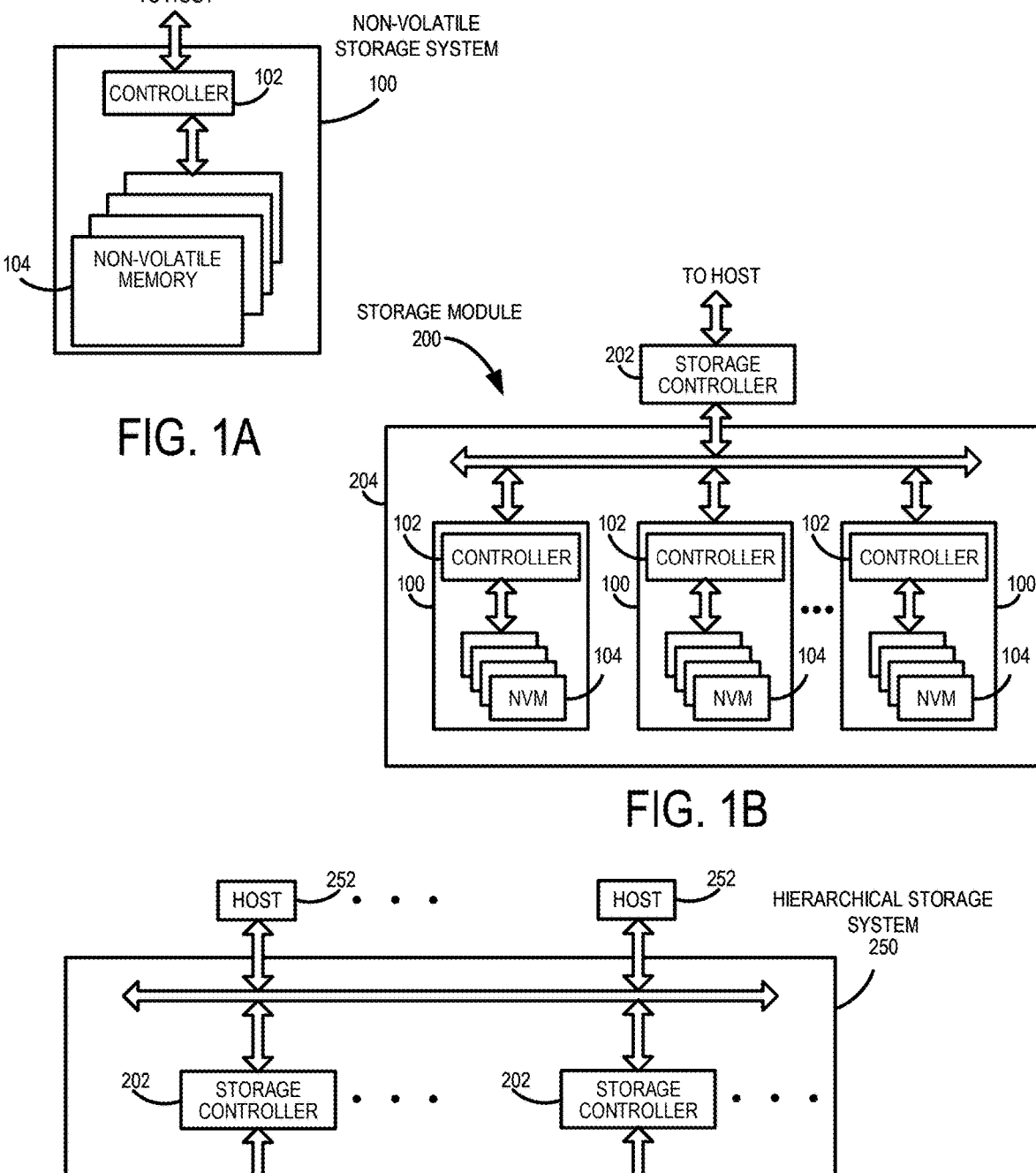
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for accommodating data of a third-party system. In one embodiment, a data storage device is provided comprising a memory and one or more processors. The one or more processors, individually or in combination, are configured to: receive data from a graphics processing unit (GPU) of a host; segregate the data; determine whether the host data (data from a GPU) is pre-approved for a capacity condition; and in response to determining that the host is pre-approved for the capacity condition: associate the segregated data per a pre-approved destination; and consolidate logical-to-physical address entry updates into a logical-to-physical address data structure.

In some embodiments, the data is segregated based on a GPU identifier.

In some embodiments, the data is segregated based on a logical block address (LBA) range.

In some embodiments, the one or more processors, individually or in combination, are further configured to: in response to determining that the host data is not pre-approved for the capacity condition: associate the segregated data with separate blocks in the memory; and maintain logical-to-physical address entry updates until host approval.

In some embodiments, the one or more processors, individually or in combination, are further configured to: in response to determining that the host data is not pre-approved for the capacity condition: associate the segregated data with separate blocks in the memory; and maintain logical-to-physical address entry updates until the logical-to-physical address entry updates are trimmed.

In some embodiments, the one or more processors, individually or in combination, are further configured to: move the segregated data to capacity blocks.

In some embodiments, the one or more processors, individually or in combination, are further configured to: monitor input-output data of the GPU and at least one additional GPU; and route the input-output data based on an instruction from the host.

In some embodiments, the one or more processors, individually or in combination, are further configured to: monitor input-output data of the GPU and at least one additional GPU; and generate parity for the input-output data based on an instruction from the host.

In some embodiments, the one or more processors, individually or in combination, are further configured to: monitor input-output data of the GPU and at least one additional GPU; and perform quality-of-service biasing of the input-output data based on an instruction from the host.

In some embodiments, the memory comprises a three-dimensional memory.

In another embodiment, a method is provided that is performed in a data storage device comprising a memory. The method comprises: receiving data from a graphics processing unit (GPU) of a host; determining whether the host is pre-approved for a capacity condition; and in response to determining that the host is pre-approved for the capacity condition: associating the data per a pre-approved destination; and consolidating logical-to-physical address entry updates into a logical-to-physical address data structure.

In some embodiments, the method further comprises segregating the data based on a GPU identifier.

In some embodiments, the method further comprises segregating the data based on a logical block address (LBA) range.

In some embodiments, the method further comprises in response to determining that the host is not pre-approved for the capacity condition: associating the data with separate blocks in the memory; and maintaining updates separately without consolidating to the main L2P table until host approval.

In some embodiments, the method further comprises in response to determining that the host is not pre-approved for the capacity condition: associating the segregated data with separate blocks in the memory; and maintaining logical-to-physical address entry updates until the logical-to-physical address entry updates are trimmed.

In some embodiments, the method further comprises: moving the data to capacity blocks.

In some embodiments, the method further comprises: monitoring input-output data of the GPU and at least one additional GPU; and routing the input-output data based on an instruction from the host.

In some embodiments, the method further comprises: monitoring input-output data of the GPU and at least one additional GPU; and generating parity for the input-output data based on an instruction from the host.

In some embodiments, the method further comprises: monitoring input-output data of the GPU and at least one additional GPU; and performing quality-of-service biasing of the input-output data based on an instruction from the host.

In yet another embodiment, a data storage device is provided comprising: a memory; and means for: segregating data received from a graphics processing unit (GPU) of a host; determining whether the host is pre-approved for a capacity condition; and in response to determining that the host is pre-approved for the capacity condition: associating the segregated data per a pre-approved destination; and consolidating logical-to-physical address entry updates into a logical-to-physical address data structure.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
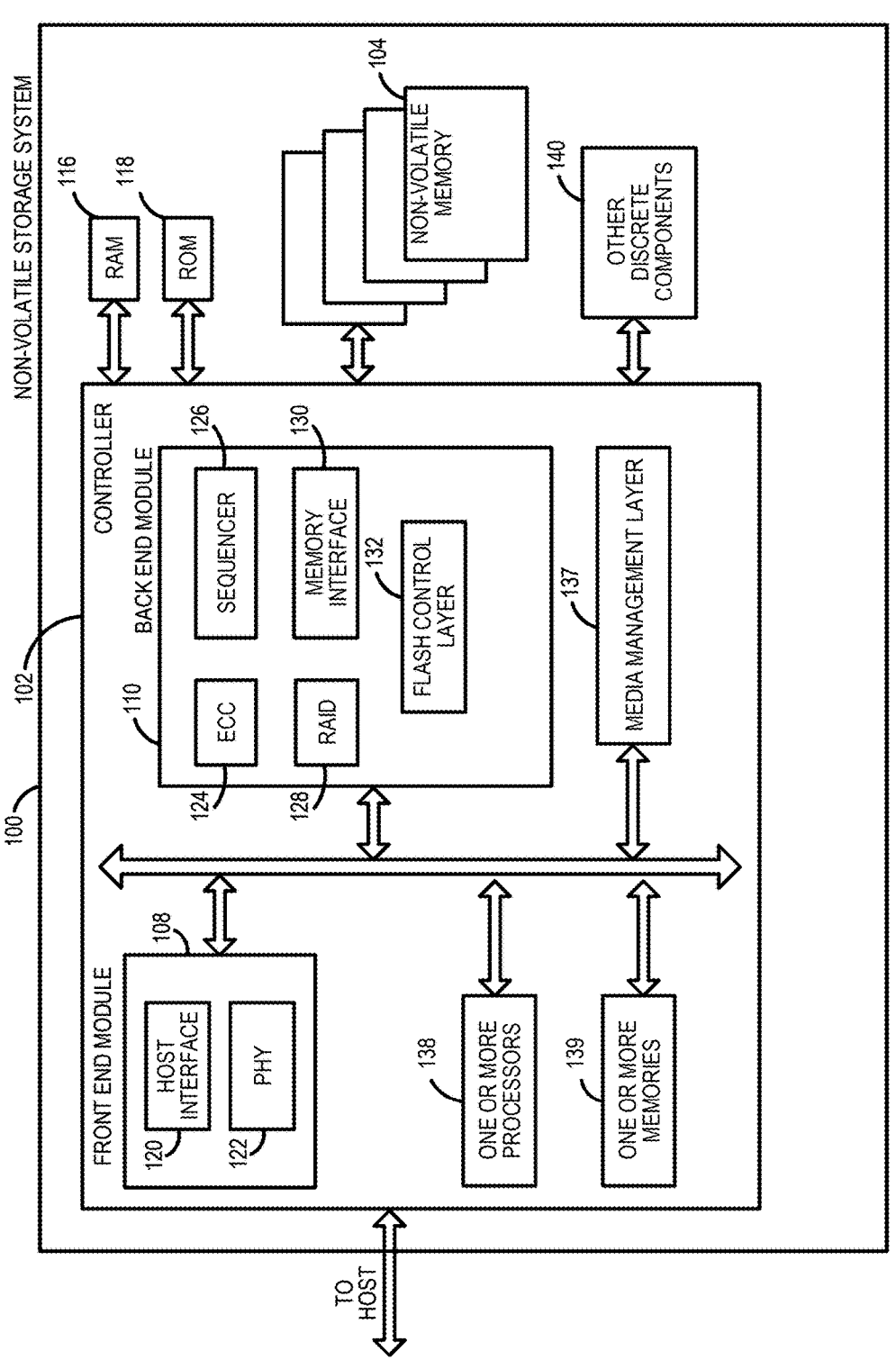
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
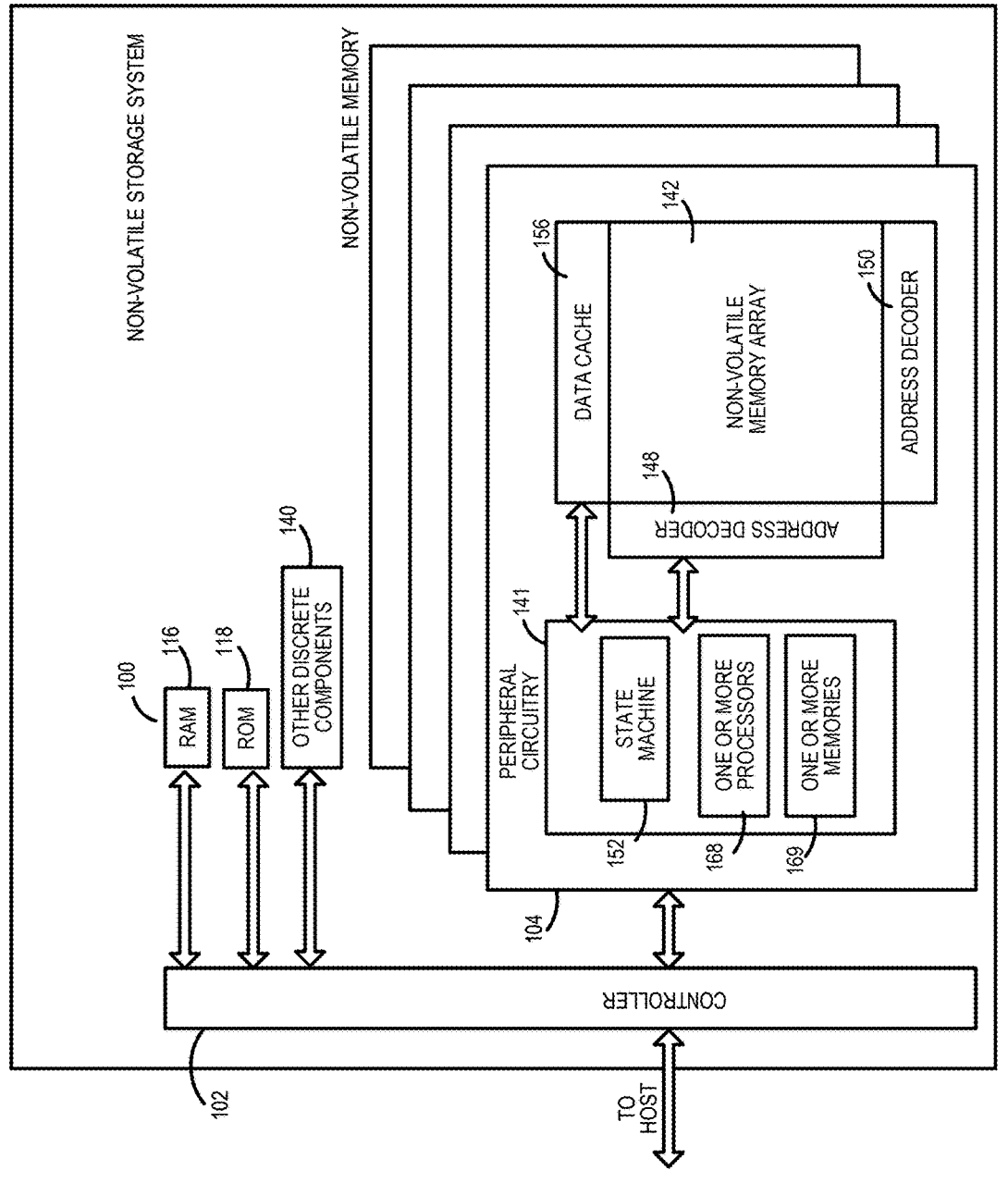
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host.

Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
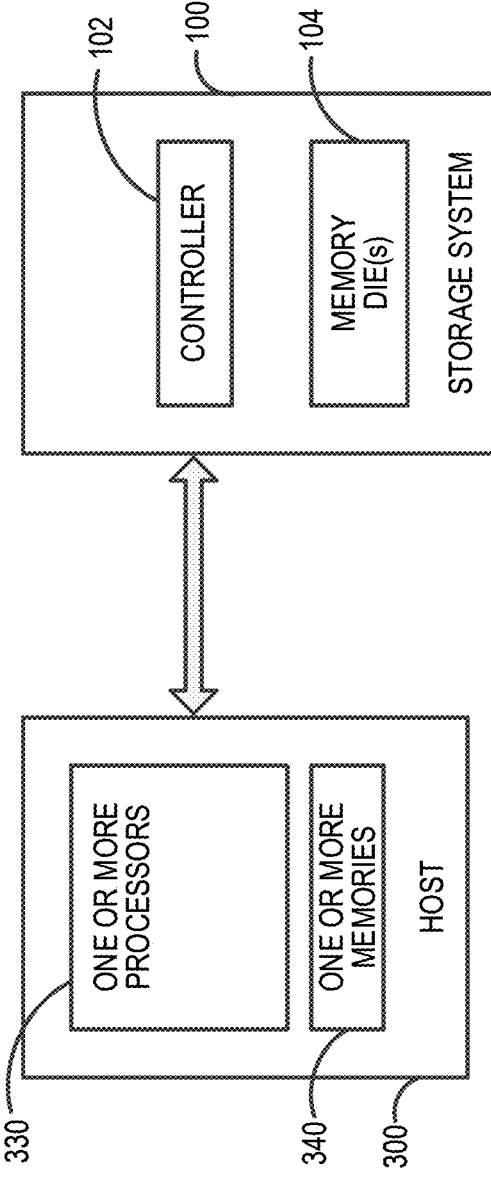
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform, individually or in combination, the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In some embodiments, the host 300 also comprises a graphics processing unit (GPU), which can be configured to accelerate graphics rendering. The GPU can be used to process a plurality of data segments simultaneously, which may be useful in environments such as artificial intelligence (AI), machine learning (ML), high-performance computing (HPC) datasets, and gaming applications. While the GPU can be a discrete hardware component separate from the host's CPU 330, in some embodiments, the GPU is integrated in the CPU 330.

FIG. 4 is a block diagram of a storage architecture of an environment. The left-side of FIG. 4 shows one or more data storage devices 100 (e.g., NVMe devices) in communication with a switch (e.g., a PCIe switch) 400 in the host 300. The switch 400 is also in communication with the host's CPU 330, GPU 350, and memory 360. In this architecture, the host's CPU 330 reads data from the data storage device 100 into the host's memory 360 and then transfers the data to the host's GPU 350.

As artificial intelligence (AI) and high-performance computing (HPC) datasets continue to increase in size, the time spent loading data for a given application begins to place a strain on the application's total performance. When considering end-to-end application performance, fast GPUs are increasingly starved by the process of loading data from the data storage device 100 to the GPU 350 for processing. This input/output (IO) process has historically been controlled by the CPU 330. However, as computation shifts from slower CPUs to faster GPUs, IO becomes more of a bottleneck to overall application performance.

Figure 4A:
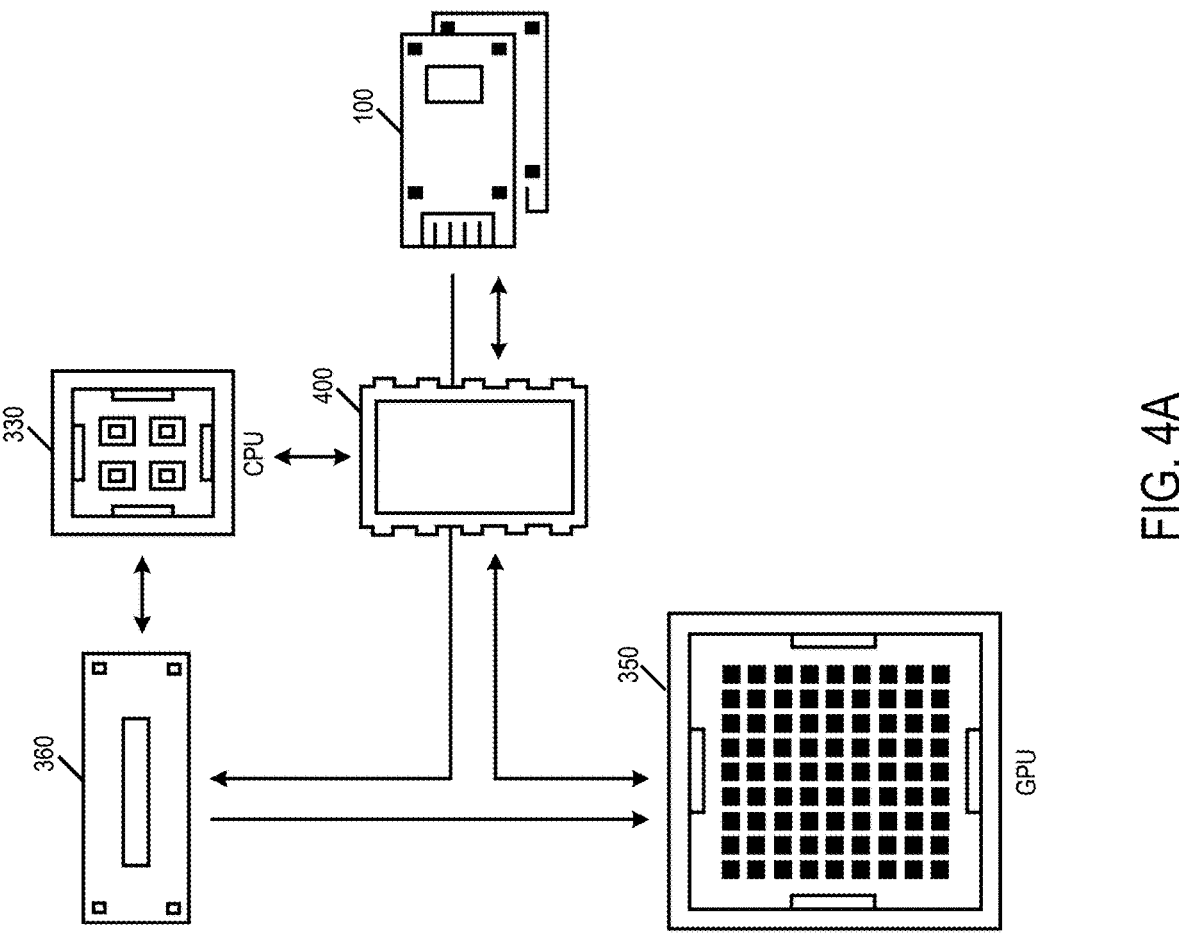
FIGS. 4A and 4B are illustrations of a storage environment of an embodiment.
Figure 4B:
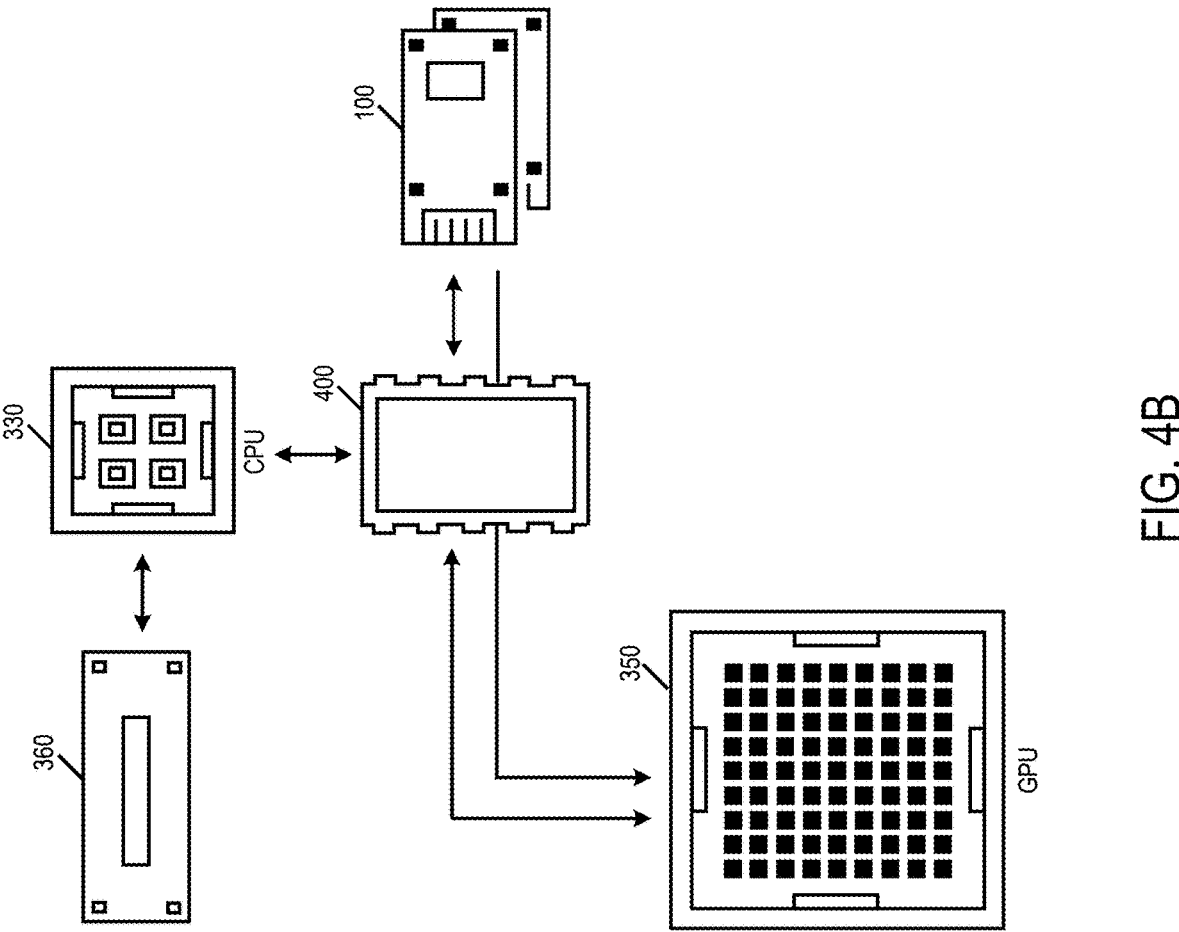

A new technology called GPUDirect® Storage addresses this issue by enabling a direct data path between local or remote storage, like NVMe or NVMe over Fabric (NVMe-oF), and the GPU. With GPUDirect®, the GPU can directly access the data storage device for any/all computations. For example, multiple systems, including GPU and accelerators, read and write to the data storage device 100 apart from the host system. In GPUDirect® storage, a direct path between the memory and the GPU is established to enable an IO that is not hindered by the host/DMA. Loading data from storage to a GPU for processing is typically controlled by the CPU. However, as computation moves from CPUs to GPUs, loading of input/output (IO) data can be a bottleneck to performance. GPUDirect® Storage can enable direct memory access (DMA) from storage that is either local to a given server or outside of the enclosure through NVMe-oF An example of the GPUDirect® architecture is shown in FIGS. 4A and 4B. As shown in FIG. 4A, GPUDirect® Storage avoids extra copies through a bounce buffer in the CPU's memory and enables a direct memory access (DMA) engine to move data on a direct path into or out of the GPU 350—all without burdening the CPU 330 or GPU 350. This architecture results in a direct data path from the data storage device 100 to the GPU 350, which provides higher bandwidth by skipping the CPU 330 altogether.

Figure 5:
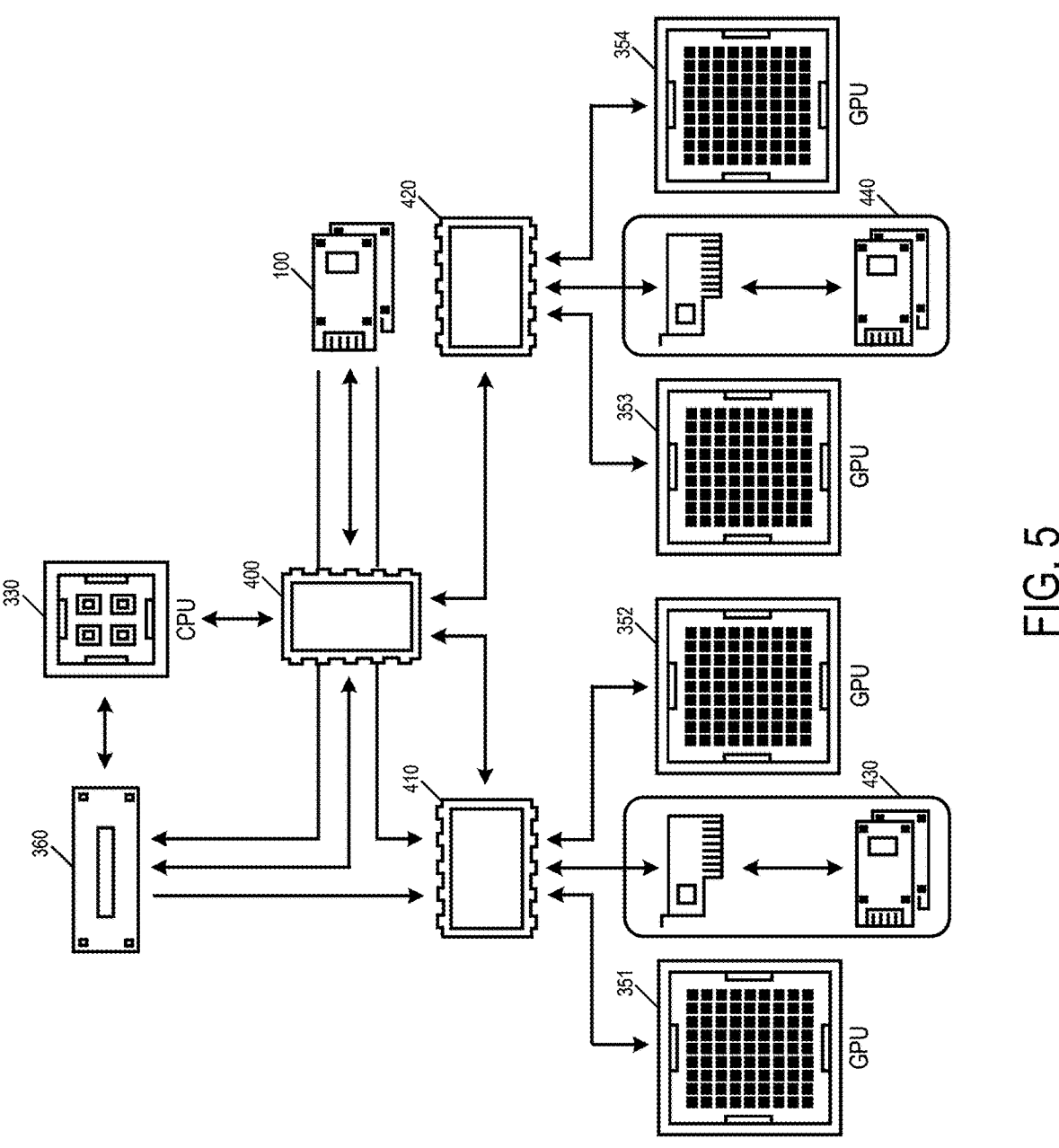
FIG. 5 is an illustration of a storage environment of an embodiment.

One common theme between data analytics and AI is that the datasets used to derive insights are often massive and lead to a scaled storage environment, such as the one illustrated in FIG. 5. As shown in FIG. 5, the host 300 comprises a plurality of GPUs 351, 352, 353, 354 instead of just one GPU 350 as in FIG. 4B. Also, in addition to the data storage device 100, a redundant array of independent drives (RAID) 430, 440 (each with its own set of data storage devices and a network interface card) are used to store data and provide it to the GPUs 351, 352, 353, 354.

When such systems write to the data storage device 100, the storage controller 102 may need to accommodate those requests owing to the protocol requirement. When the GPU session ends, the data that is written to the data storage device 100 during the session could be metadata or other data that may be required for longer, can simply be scratch data that is no longer required during the next session, or both. The GPU is just a client that uses the NVMe device as a placeholder to enhance IO. It becomes the host CPU's responsibility to manage such data.

Usually, multiple GPUs can access data storage devices, but the management of namespaces and partitions on the storage device is typically handled by the operating system or storage management software. The GPUs can read from or write to the data storage device 100 as needed, but they do not directly control or manage the data storage device's namespaces. When the GPU data is not required anymore (either during or at the end of the session), the host system usually trims such data (also called deallocate). In a few cases, the host 300 may simply trim the entire region associated with the GPU once the session ends. This is double work in Flash since the GPU data is already part of the data storage device, and garbage collection effort is required to clean up blocks. The data trim can involve backend garbage collection that leads to higher write-amplification (WA) and can impact quality of service (QOS). There may be a need for a master control mechanism to handle the interface, as well as proactively optimize the overheads in the Flash backend for enhanced QoS in such systems. Secure data protection is a by-product advantage of the following embodiments.

Some implementations of the following embodiments can be applicable for environments where there is a master host and the client accelerators or GPU system connect and disconnect. Without limitation, some implementations of the following embodiments may not be applicable to a virtual machine (VM) environment where each virtual machine is a host and independently communicates with the data storage device based on a configuration and access permissions set-up by the virtualization infrastructure.

In one embodiment, the storage controller 120 associates the IO requests of a GPU or an accelerator (or any third-party system that is not a host system) based on its logical range of operation, manages the corresponding GPU IO data in a GPU-specific flash metablock (e.g., a set of blocks across a plurality of metadies), as well as maintains a specific logical-to-physical (L2P) update-entry table for a GPU and withholds L2P consolidation for a GPU, thereby not unconditionally mixing the GPU IO in the main storage capacity region in the memory 104 device until master host approval.

The storage controller 102 can segregate and separately track the GPU-specific data until the host 300 approves accommodation for that GPU range. Post-approval, the controller 102 can consolidate the specific L2P update entries to the main L2P table resulting in merging the GPU data with the main device data. The device controller 102 may determine the association of the IOs to the host and GPUs based on the logical range of operation, based on the submission queues used for such requests, or based on a vendor configuration from the host system. The approval may be periodic or based on a threshold amount of GPU commands or data bytes or once during the end of the GPU session.

Figure 6:
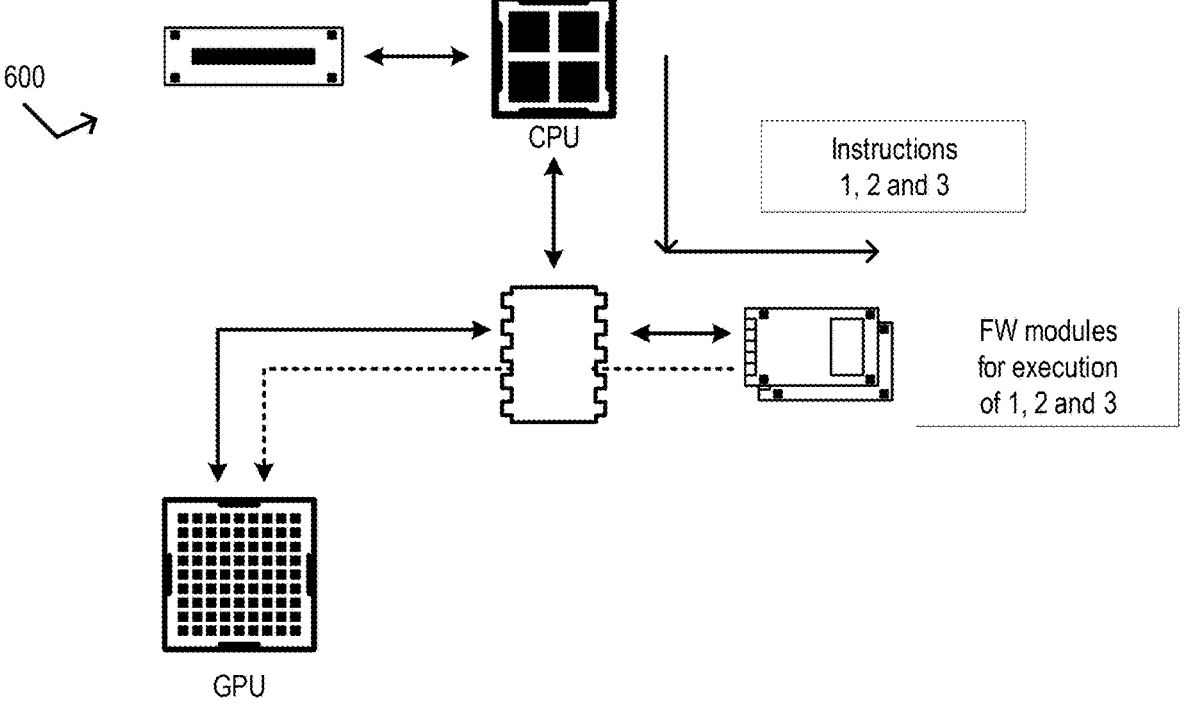
FIG. 6 is an illustration of a storage environment of an embodiment that provide graphics processing unit (GPU) accommodation according to host instructions.

FIG. 6 is an illustration of a storage environment of an embodiment that provide GPU accommodation according to host instructions. This drawing references instructions 1, 2, and 3. Instruction 1 is a pre-instruction on GPU IO trim for each range operated by a GPU. Instruction 2 is a parity-biasing instruction for each GPU in the system. Instruction 3 is a QoS-biasing instruction for each GPU in the system.

The host system (host CPU) is configured to generate permission to the data storage device 100 to accommodate one or many IO ranges of any GPU to the memory capacity based on the retention of such data. The controller 102 can consolidate L2P updates of such data range that accommodate the GPU IO to the mainline, and the other L2P update ranges can be simply discarded resulting in automatic trimming without needing garbage collection in the data storage device 100 at a later point. It is noted that the typical data storage device has no obligation to separate the IO of any system.

In some cases, the host 300 may pre-approve some GPU IO, wherein the storage controller 102 directly accommodates the data into its capacity range. During an accommodation pre-approval, it may also instruct parity biasing or QoS biasing (command execution arbitration policy) for those GPUs. The state machine of pre-approval can be on par with legacy systems, which do not work based on approval mechanism.

The storage controller 102 may additionally modify memory destination blocks based on pre-approvals for accommodation. As an example, when there is approval, it may route the GPU data or metadata directly to the capacity blocks, such as QLC, and use the same blocks for other committed GPUs since the data is not anticipated to be trimmed.

Figure 7:
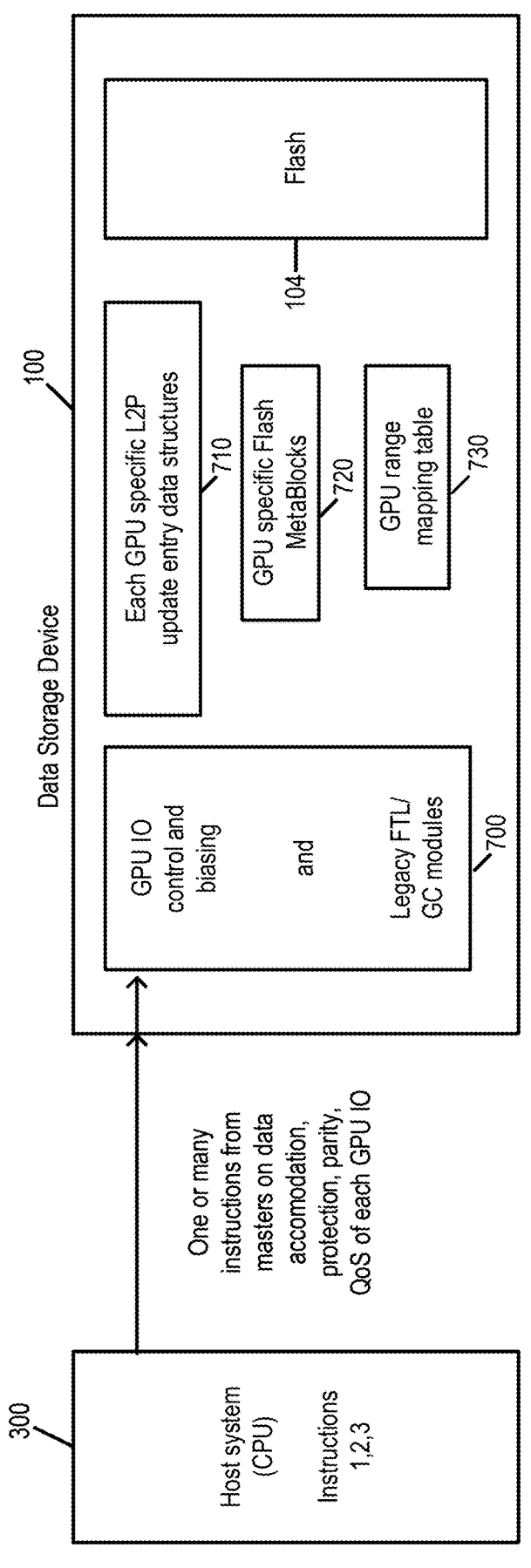
FIG. 7 is an illustration of a host and data storage device of an embodiment.

FIG. 7 is another illustration of the host 300 and data storage device 100 of an embodiment. As shown in FIG. 7, the data storage device 100 of this embodiment comprises a GPU IO control and biasing module 700, a GPU-specific L2P update entry 710, GPU-specific Flash metablocks 720, and a GPU range mapping table 730.

As a by-product, the host system (host CPU) is configured to generate permission to the data storage device 100 such that the controller 102 can protect the data associated with one or more GPUs from other GPUs in the data storage device 100 (read protection as well as over-write protection). As another by-product, this embodiment enables efficient secure data erases of certain GPU IOs since they are segregated in the first place in specific NAND blocks pending approvals to be merged to the mainline storage. These blocks can be independently physically erased (and hence secure) with performing efficient garbage collection based on requirements.

The host system of this embodiment may additionally configure the data storage device 100 to let go of all the data associated with a specific GPU through vendor commands resulting in the controller 102 erasing the L2P update-entries of that GPU and erasing the corresponding GPU metablock, thereby completely nullifying that GPU's activities (write) in the data storage device 100 based on the application requirements. This is vastly effective compared to a trim command since any NAND overhead is avoided. Such a system flow easily cleans up the data garbage created by any GPU or accommodates that data into its capacity. As an example, when a game ends at any level such that the game involves a restart from beginning, all the transient data cached so far in NVMe is not necessary for the application.

The host system can be further configured to instruct the data storage device 100 to bias specific GPUs attached to it via specific submission queues to enhance QoS of one or more GPUs compared to its peer GPUs. This also addresses the grey area where any GPU can be a host system. In one embodiment, the host system is the master, and the GPUs are clients that connect and disconnect to the data storage device 100 through PCIe switches based on application needs. The ownership of the device data, its protection level, and, optionally, its parity stays with the host system and not with any GPU even if the data is associated with the GPU.

This way, the third-party GPUs are free to use the device for faster IO exchange (the primary purpose of GPUDirect® Storage); however, data sharing can be optionally restricted and controlled by the master. The mechanism not only protects existing data from any rogue GPUs overwriting data ranges but also enables an easy clean up and disconnection of a GPU at a NAND block level.

In one example implementation, the controller 102 may manage GPU metablocks, GPU update entry data structures, GPU range mapping table, and GPU control provisions in the firmware module that oversees the approval-based IO accommodation for one or more GPUs using.

It may be noted that the post-approval workload for the data storage device 100 may only be control data consolidation as the actual IOs would have been completed during the GPU session itself. The system may also dynamically modify approval frequency based on this workload. The approvals may be associated with data ranges. It may also be noted that the GPU IO segregation is internal to data storage device 100, and the external systems can be abstracted from it. These embodiments provide the advantages of better device performance, lower flash write amplification, and minimal flash overhead.

Figure 8:
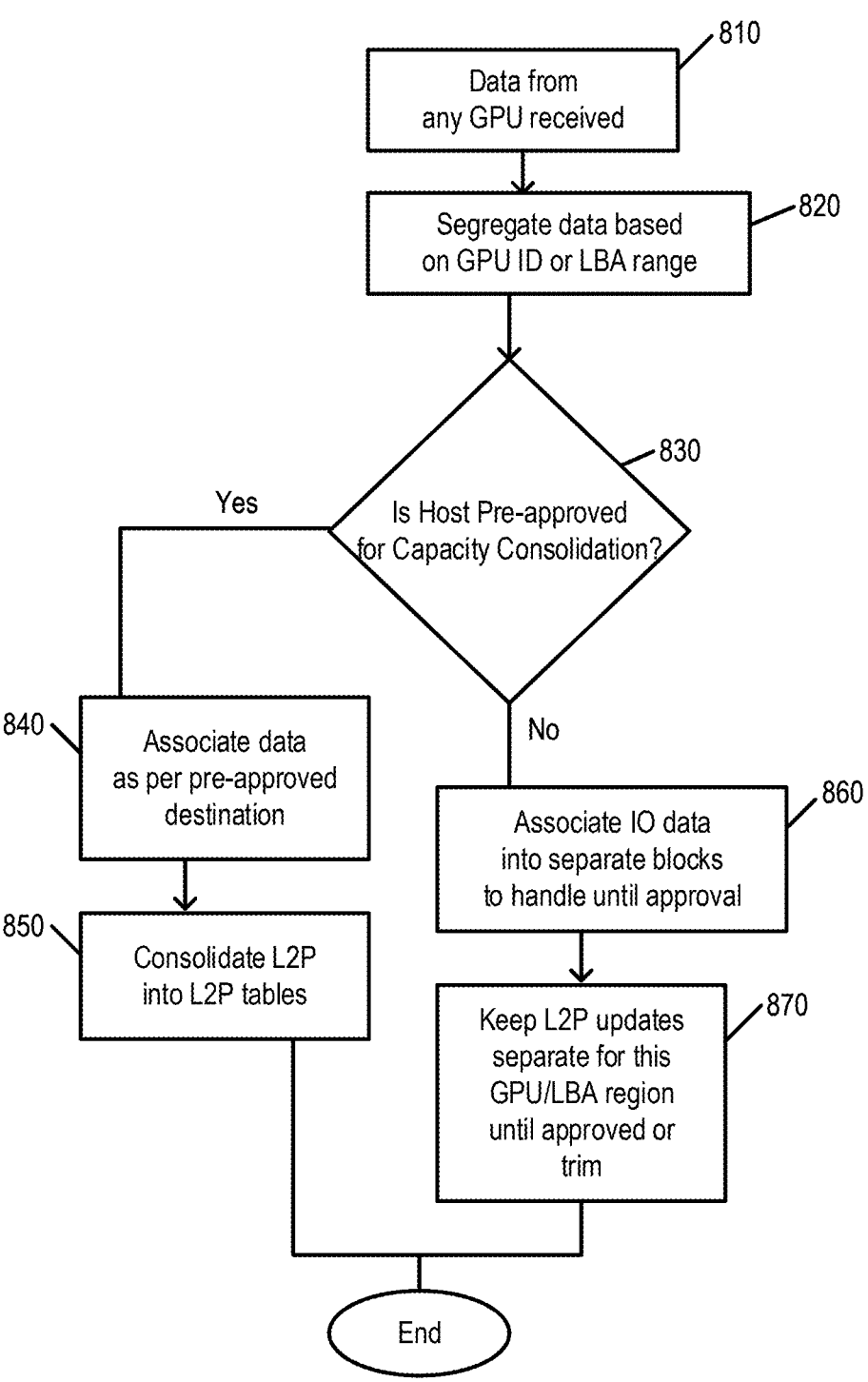
FIG. 8 is a flow chart of an embodiment.

Turning again to the drawings, FIG. 8 is a system flow chart of an embodiment. As shown in FIG. 8, in this method, data from any GPU is received (810), and the controller 102 of the data storage device 100 segregates the data based on a GPU identifier (ID) or LBA range (820). The controller 102 then determines if the host 300 is pre-approved for the capacity condition (830). If the host 300 is pre-approved, the controller 102 associates data as per the pre-approved destination (840) and consolidates L2P update entries into L2P tables (850). If the host 300 is not pre-approved, the controller 102 associates input-output (IO) data into separate blocks and handles until approved (860). The controller 102 keeps L2P updates for this GPU/LBA region until approved or trimmed (870).

Figure 9:
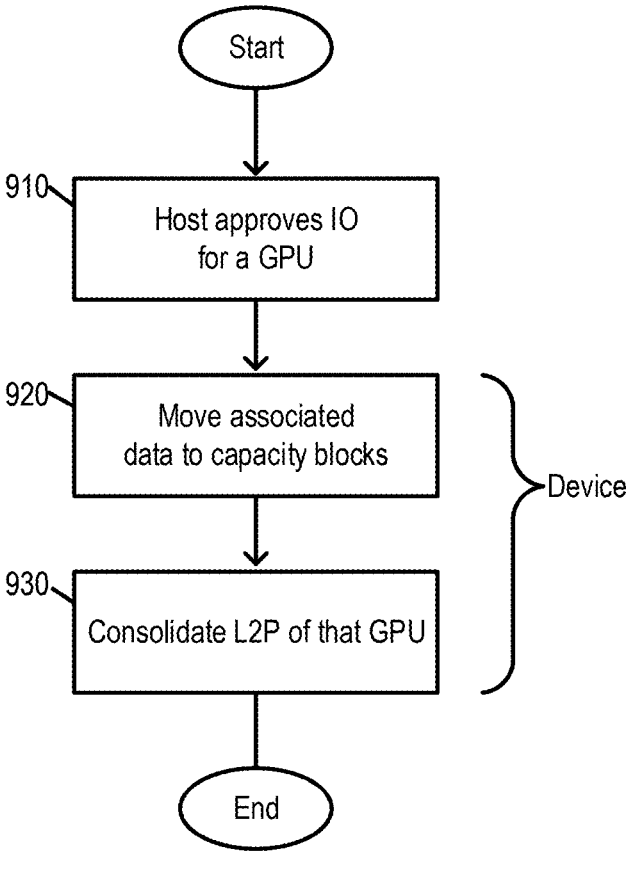
FIG. 9 is a flow chart of an embodiment.

FIG. 9 is a host approved flow chart of an embodiment. As shown in FIG. 9, in this method, the host 300 approves IO for a GPU (910). Then, the controller 102 of the data storage device 100 moves associated data to capacity blocks (920) and consolidates the L2P entries of that GPU (930).

Figure 10:
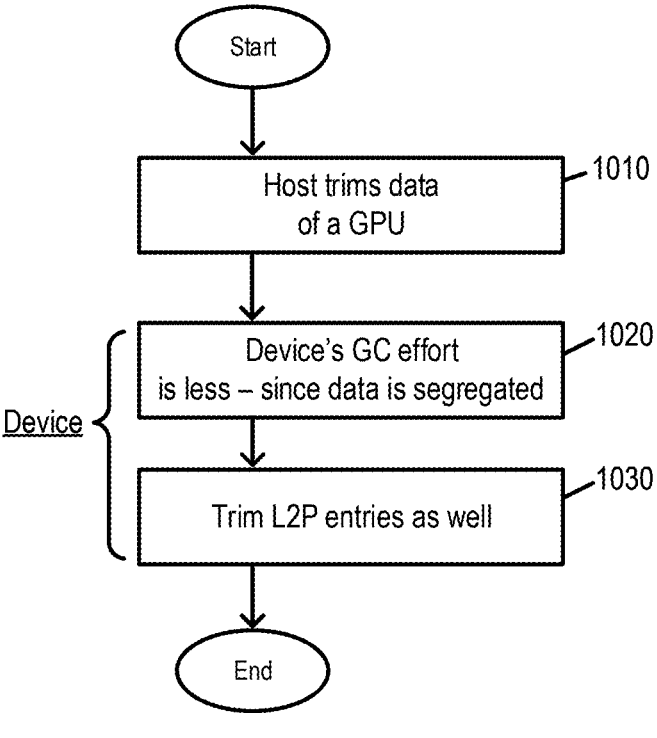
FIG. 10 is a flow chart of an embodiment.

FIG. 10 is a flow chart of a trim operation of an embodiment. As shown in FIG. 10, in this method, the host 300 trims data of a GPU (1010). Then, the controller 102 of the data storage device 100 reduces garbage collection because the data is segregated (1020). Next, the controller 102 trims the L2P entries (1030).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   one or more processors, individually or in combination, configured to:
      receive data and a logical address directly from a graphics processing unit (GPU) of a host as opposed to indirectly through a central processing unit (CPU) of the host;
      store the data in a location of the memory configured to store only data received from the GPU as opposed to data received from the CPU;
      store an entry in a secondary logical-to-physical address data structure to reflect that the data is stored in the location in the memory, wherein the secondary logical-to-physical address data structure stores only entries for the location in the memory as opposed to other locations in the memory that store data received from the CPU;
      determine whether the data is pre-approved for a capacity condition;
      in response to determining that the data is not pre-approved for the capacity condition:
         discard the entry in the secondary logical-to-physical address data structure; and
         perform garbage collection only in the location in the memory as opposed to the other locations in the memory; and
      in response to determining that the data is pre-approved for the capacity condition: merge the secondary logical-to-physical address data structure into a primary logical-to-physical address data structure that stores entries for the other locations in the memory.

2. The data storage device of claim 1, wherein the data is received with a GPU identifier.

3. The data storage device of claim 1, wherein the logical address is part of a logical block address (LBA) range associated with the GPU.

4. The data storage device of claim 1, wherein the one or more processors, individually or in combination, are further configured to:
   move the data to capacity blocks.

5. The data storage device of claim 1, wherein the one or more processors, individually or in combination, are further configured to:
   monitor input-output data of the GPU and at least one additional GPU; and
   route the input-output data based on an instruction from the host.

6. The data storage device of claim 1, wherein the one or more processors, individually or in combination, are further configured to:
   monitor input-output data of the GPU and at least one additional GPU; and
   generate parity for the input-output data based on an instruction from the host.

7. The data storage device of claim 1, wherein the one or more processors, individually or in combination, are further configured to:
   monitor input-output data of the GPU and at least one additional GPU; and
   perform quality-of-service biasing of the input-output data based on an instruction from the host.

8. The data storage device of claim 1, wherein the memory comprises a three-dimensional memory.

9. A method comprising:
   performing in a data storage device comprising a memory:
      receiving data and a logical address directly from a graphics processing unit (GPU) of a host as opposed to indirectly through a central processing unit (CPU) of the host;
      storing the data in a location of the memory configured to store only data received from the GPU as opposed to data received from the CPU;
      storing an entry in a secondary logical-to-physical address data structure to reflect that the data is stored in the location in the memory, wherein the secondary logical-to-physical address data structure stores only entries for the location in the memory as opposed to other locations in the memory that store data received from the CPU;
      determining whether the host is pre-approved for a capacity condition;
      in response to determining that the host is pre-approved for the capacity condition:
         discarding the entry in the secondary logical-to-physical address data structure; and
         performing garbage collection only in the location in the memory as opposed to the other locations in the memory; and
      in response to determining that the data is pre-approved for the capacity condition: merging the secondary logical-to-physical address data structure into a primary logical-to-physical address data structure that stores entries for the other locations in the memory.

10. The method of claim 9, wherein the data is received with a GPU identifier.

11. The method of claim 9, wherein the logical address is part of a logical block address (LBA) range associated with the GPU.

12. The method of claim 9, further comprising:
   moving the data to capacity blocks.

13. The method of claim 9, further comprising:

monitoring input-output data of the GPU and at least one additional GPU; and routing the input-output data based on an instruction from the host.

14. The method of claim 9, further comprising:

monitoring input-output data of the GPU and at least one additional GPU; and generating parity for the input-output data based on an instruction from the host.

15. The method of claim 9, further comprising:

monitoring input-output data of the GPU and at least one additional GPU; and performing quality-of-service biasing of the input-output data based on an instruction from the host.

16. A data storage device comprising:

a memory; and means for:

receiving data and a logical address directly from a graphics processing unit (GPU) of a host as opposed to indirectly through a central processing unit (CPU) of the host;

storing the data in a location of the memory configured to store only data received from the GPU as opposed to data received from the CPU;

storing an entry in a secondary logical-to-physical address data structure to reflect that the data is stored in the location in the memory, wherein the secondary logical-to-physical address data structure stores only entries for the location in the memory as opposed to other locations in the memory that store data received from the CPU;

determining whether the host is pre-approved for a capacity condition;

in response to determining that the host is pre-approved for the capacity condition:

discarding the entry in the secondary logical-to-physical address data structure; and performing garbage collection only in the location in the memory as opposed to the other locations in the memory; and in response to determining that the host is pre-approved for the capacity condition: merging the secondary logical-to-physical address data structure into a primary logical-to-physical address data structure that stores entries for the other locations in the memory.

\* \* \* \* \*